T861010

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 1, 1969

861 O.G. 18

772,384
MULTICOLOR COATING COMPOSITION
James G. Stranch and Billy D. Anderson, both of P.O. Box 511, Kingsport, Tenn. 37662
Filed Oct. 31, 1968. Published Apr. 1, 1969
Class 260—17
No Drawing. 3 Pages Specification

Multicolor coating compositions which can be applied to surfaces either by brushing or spraying comprise cellulose acetate butyrate particles of at least two different colors dispersed in a film-forming liquid material in which the cellulose acetate butyrate particles are insoluble. Typical of the film-forming liquids in which the cellulose acetate butyrate particles can be dispersed are varnishes, enamels, or aqueous emulsions of polyvinyl acetate or copolymers of vinyl acetate and acrylic acid.